United States Patent [19]

Komatsu

[11] Patent Number: 5,214,647
[45] Date of Patent: May 25, 1993

[54] CSMA TYPE COMMUNICATION SYSTEM

[75] Inventor: Yuji Komatsu, Tokyo, Japan

[73] Assignee: NEC Corporation, Tokyo, Japan

[21] Appl. No.: 652,519

[22] Filed: Feb. 8, 1991

[30] Foreign Application Priority Data

Feb. 8, 1990 [JP] Japan ................................. 2-30160

[51] Int. Cl.⁵ ............................................. H04J 3/02
[52] U.S. Cl. .................................. 370/85.3; 370/85.1;
370/100.1; 340/825.47
[58] Field of Search ................... 370/85.3, 85.1, 85.2,
370/85.6, 100.1, 91, 92, 93; 340/825.05, 825.52,
825.5, 825.51, 825.27, 825.47; 375/8; 379/280

[56] References Cited

U.S. PATENT DOCUMENTS

| | | | |
|---|---|---|---|
| 4,637,013 | 1/1987 | Nakamura | 370/85.4 |
| 4,768,032 | 8/1988 | Sharpe et al. | 340/825.47 |
| 4,860,006 | 8/1989 | Barall | 370/85.3 |
| 4,939,725 | 7/1990 | Matsuda et al. | 370/85.3 |
| 4,987,571 | 1/1991 | Haymond et al. | 370/85.3 |
| 5,043,718 | 8/1991 | Shimura | 340/825.47 |

FOREIGN PATENT DOCUMENTS 0344035 11/1989 European Pat. Off. ............ 370/85.3
169452 4/1981 Japan.

Primary Examiner—Douglas W. Olms
Assistant Examiner—Dang Ton
Attorney, Agent, or Firm—Whitham & Marhoefer

[57] ABSTRACT

A CSMA type transmission system for transmitting digital data among a data processing unit and a number of units connected to a bus, each of the units including a storage for storing an own inherent address data, a group address data common to a plurality of data collecting units and a data-bit position data designated inherently to the units belonging to the same group; an address comparator for comparing a master address or a slave address in a transmission frame on the bus with the group address data; a bit position comparator for counting a synchronous signal at a data portion in the transmission frame and comparing the synchronous signal with the data-bit position data; and a data transmitter for transmitting data synchronously with the synchronous signal at the own inherent bit position in the transmission frame when the master address or the slave address coincides with the contents of the own group address data. Since it is possible to transmit the transmission data among a number of grouped units with one transmission frame, the data from a number of data collecting units connected to the bus can be transferred to the data processing unit speedily thereby enabling the system to operate at a high speed.

6 Claims, 6 Drawing Sheets

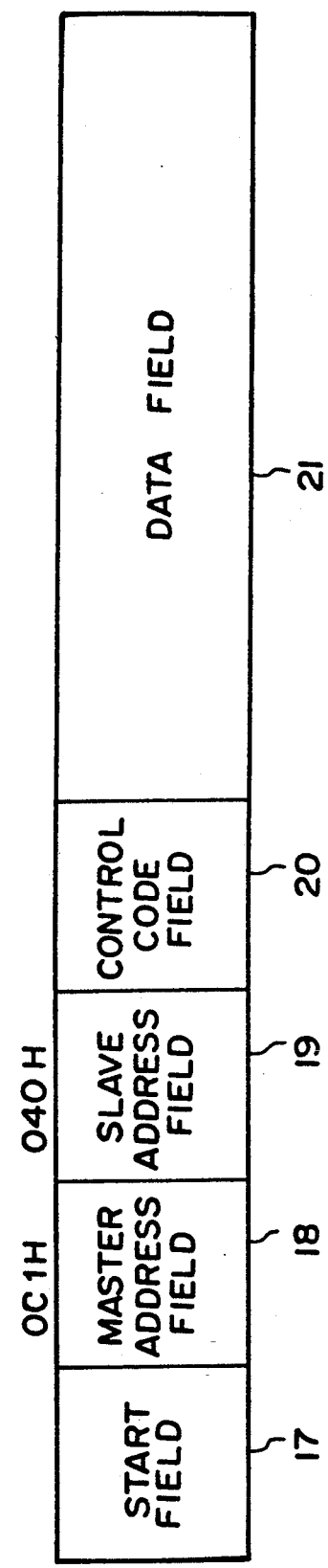

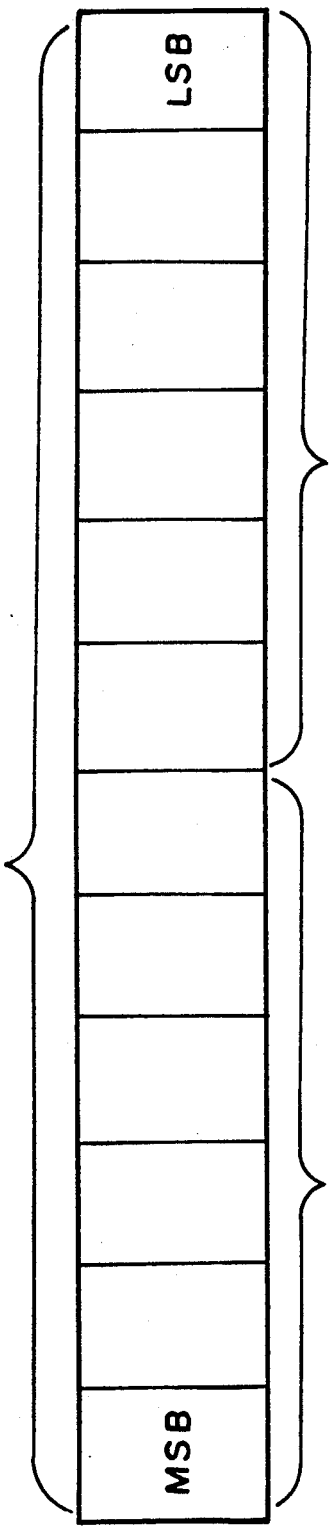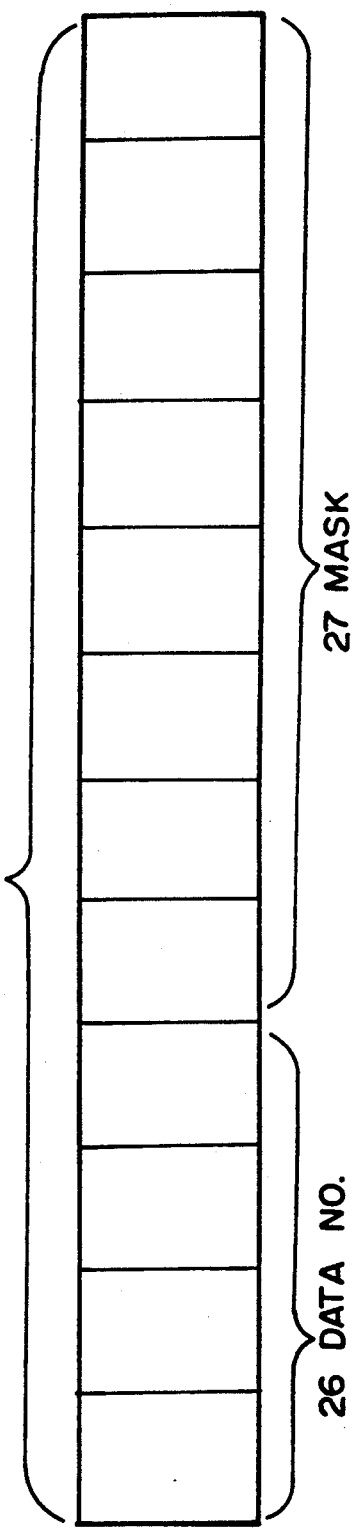

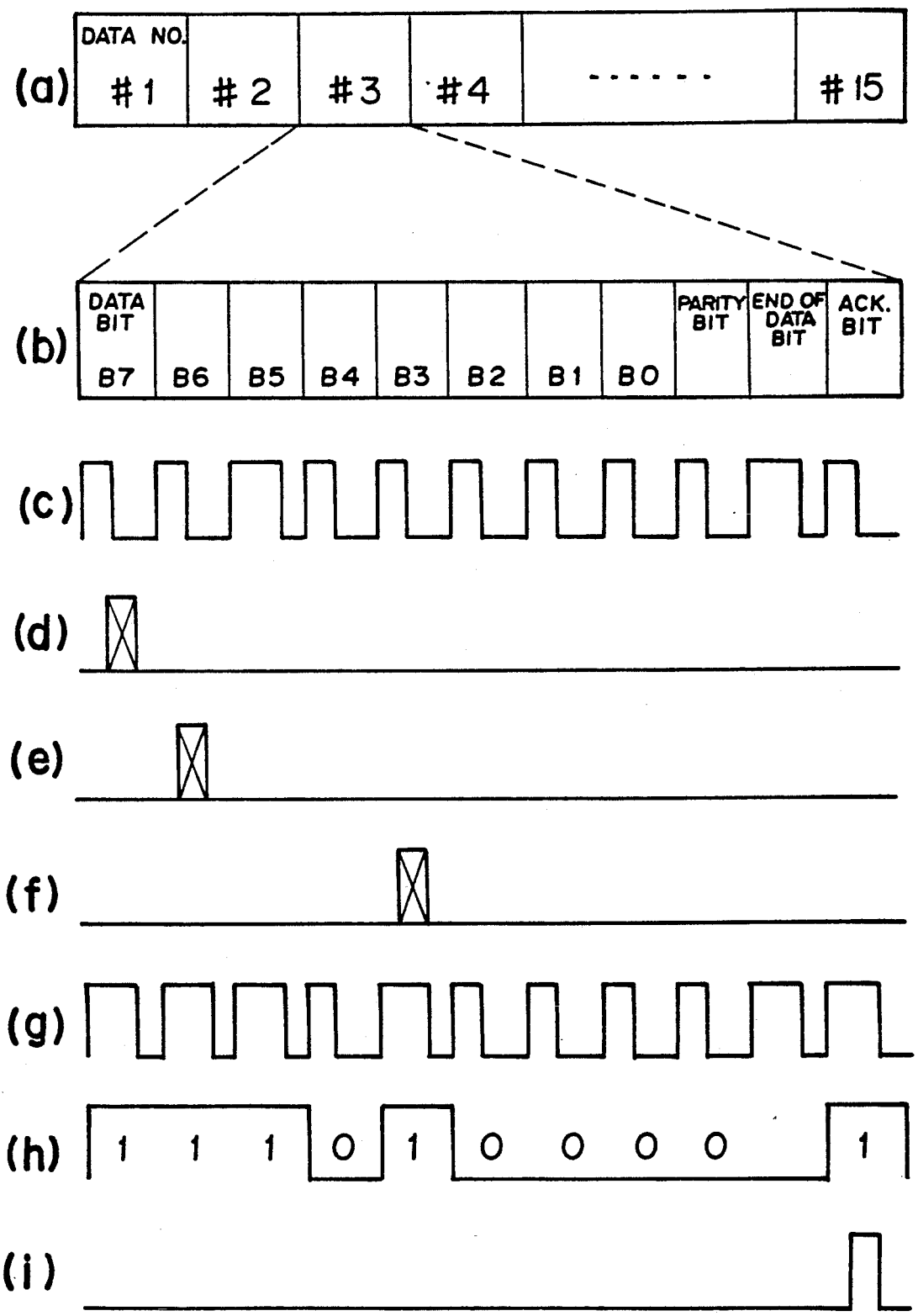

CSMA TYPE COMMUNICATION SYSTEM

BACKGROUND OF THE INVENTION

The present invention relates to a CSMA type communication system and, more particularly, to a CSMA type communication system which is capable of effecting a high speed transmission of digital data among a plurality of units.

As a conventional communication system for transmitting digital data among a plurality of units which operate asynchronously with one another, there has been available a system known as the CSMA (Carrier Sense Multiple Access) type communication system. Such a system is disclosed in, for example, Japanese Patent Application Kokai No. Sho 56(1981)-169,452.

In a CSMA type transmission system, any number of units connected to a bus may monitor a signal on the bus and, in the absence of the signal on the bus a transmission frame can be forwarded out to the bus at any time. The transmission frame thus sent to the bus is generally formed by such fields as a master address field, a slave address field, a control code field and a data field. These fields represent an address data of the unit outputting the transmission frame, an address data of a destination unit, a kind of transmission data or a direction of data transfer and a transmission data, respectively. The unit which has detected a transmission frame on the bus receives a master address field and a slave address field in synchronization with the synchronizing signal contained in the transmission frame. When the value of the slave address field received coincides with that of inherent address data which was assigned to the received unit, the unit receives further a control code field. If the code of this control code indicates transfer of data from the master unit to the slave unit, the unit receives the data field to follow. On the contrary, if the control code indicates transfer of data from the slave unit to the master unit, the data is sent to the bus at the data field in synchronization with the synchronizing signal.

Thus, in the conventional system, the master unit monitoring a signal on the bus sends a transmission frame and the slave unit receives such transmission frame. Further, the data field of the transmission frame is such that either the master unit or the slave unit may fill the data to be transmitted.

In the conventional CSMA type transmission system as explained above, the communication with respect to one frame is made only between the master side unit and the slave side unit, so that it is necessary for the system to have as many transmission frames as the number of the units in order to receive the digital data through the bus among a number of units connected to the bus. This results in a disadvantage in that the time required for transmission is considerably longer than that required in the communication between the two stations.

SUMMARY OF THE INVENTION

It is, therefore, an object of the present invention to provide an improved CSMA type communication system which overcomes the above disadvantages of the conventional system.

It is another object of the invention to provide a CSMA type communication system in which the time required for transmission is reduced thereby enabling a high speed data transfer in the data transmission.

It is a further object of the invention to provide a CSMA type communication system in which only one transmission frame is sufficient for a plurality of grouped units to effect the transmission of data.

According to one aspect of the invention, there is provided a CSMA type communication system for transmitting digital data among a data processing unit and a number of groups of data collecting units connected to a bus, the data collecting units each comprising:

a means for storing an own inherent address data, a group address data common to the data collecting units in the same group and a data-bit position data inherently allotted to each of the data collecting units in the same group;

an address comparing means for comparing a master address or a slave address in a transmission frame on the bus with the group address data;

a bit position comparing means for counting a synchronizing signal at a data portion in the transmission frame and comparing the synchronizing signal with the data-bit position data; and a data transmission means for transmitting data synchronously with the synchronizing signal at the own data-bit position in the transmission frame when the master address or the slave address in the transmission frame coincides with the content of the own group address data.

In the CSMA type communication system according to the present invention, since it is possible to transmit with one transmission frame the transmission data of a plurality of grouped units, the data from a number of the data collecting units connected to the common bus can be transferred to the data processing units speedily, thereby enabling the system to operate at a high speed.

BRIEF DESCRIPTION OF THE DRAWINGS

The above and other objects, features and advantages of the present invention will be apparent from the following description of preferred embodiments according to the invention explained with reference to the accompanying drawings, in which:

FIG. 3 shows a structure of a transmission frame used in the system shown in FIG. 1;

FIG. 4 shows a structure of an address data inherent to a destination unit used in the system shown in FIG. 1;

FIG. 5 shows a structure of bit position data held by the data collecting unit shown in FIGS. 1 and 2;

FIG. 6 shows by timing charts the relationship between data fields and signals outputted into the bus.

PREFERRED EMBODIMENTS OF THE INVENTION

Throughout the following explanation, similar reference symbols or numerals refer to the same or similar elements in all figures of the drawings.

Now, some preferred embodiments of the invention are explained with reference to the appended drawings.

Figure 1:
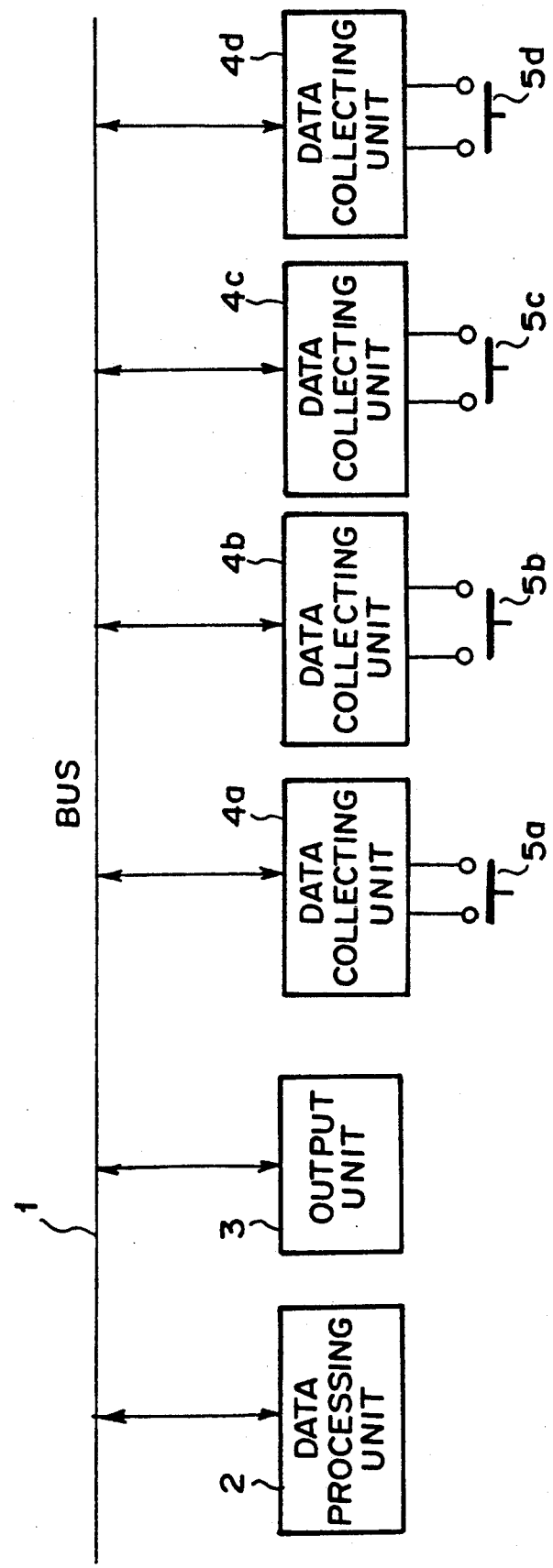
FIG. 1 shows in a block diagram a CSMA type communication system of a first embodiment according to the present invention.

FIG. 1 shows in a block diagram a CSMA type communication system as a first embodiment according to the present invention. A data processing unit 2, an output unit 3, a plurality of data collecting units 4a-4d are connected to a common bus 1. Key-switches 5a-5d are connected respectively to the data collecting units 4a-4d.

Figure 2:
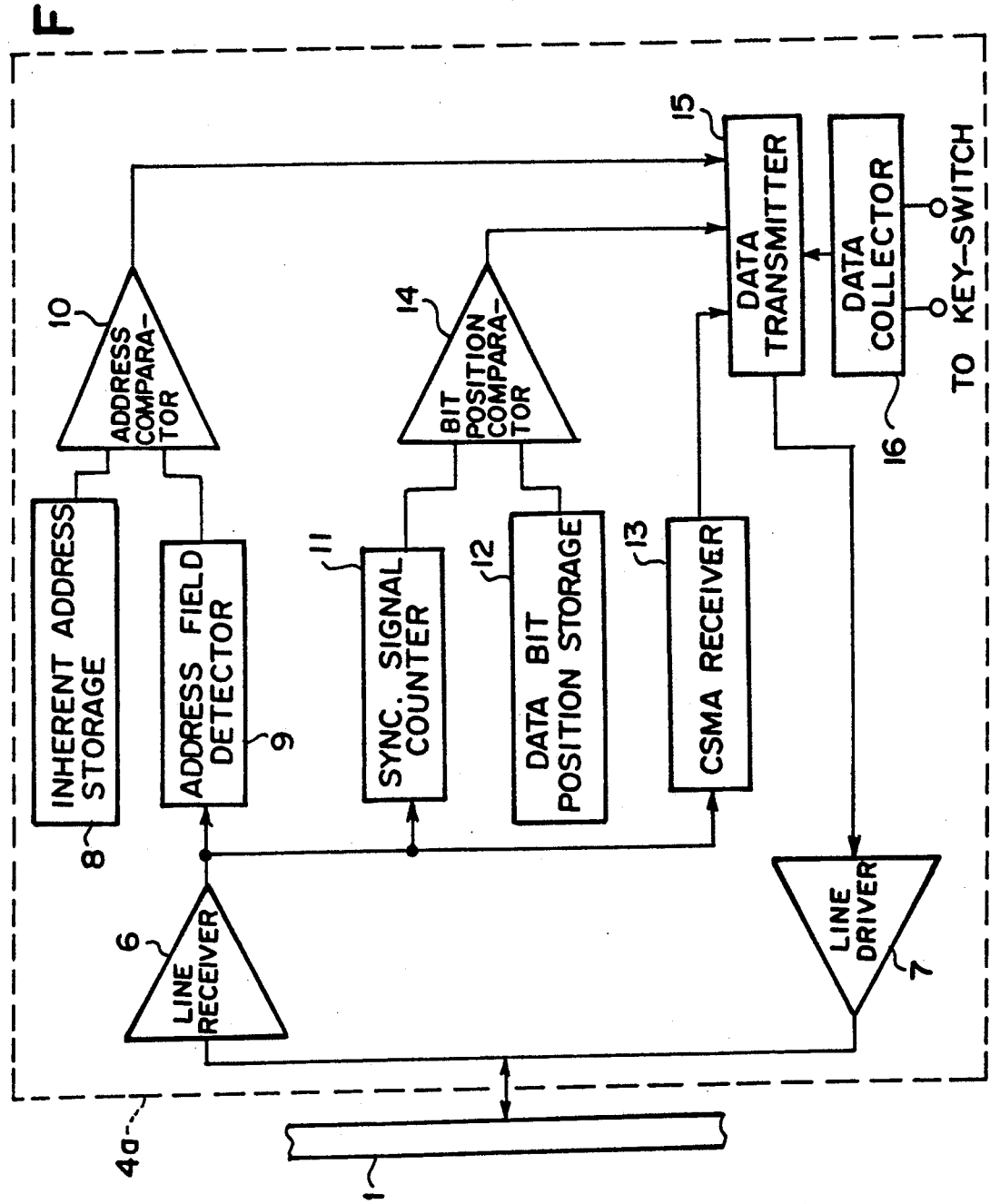
FIG. 2 shows in a block diagram an arrangement of a data collecting unit included in the system shown in FIG. 1.

FIG. 2 shows in a block diagram a detailed configuration of each of the data collecting units of FIG. 1. As shown in FIG. 2, the data collecting unit 4a as a representative one comprises a line receiver 6 which is connected to the bus 1 and receives data; a line driver 7 which is also connected to the bus 1 and outputs data; an inherent address storage 8; a data bit position storage 12; an address field detector 9 for detecting an address field in the output from the line receiver 6; an address comparator 10 for comparing outputs from the inherent address storage 8 and the address field detector 9; a synchronous signal counter 11 for detecting and counting the synchronizing signal from the line receiver 6; a CSMA receiver 13 connected to the line receiver 6; a bit position comparator 14 for comparing outputs from the synchronous signal counter 11 and the data bit position storage 12; a data transmitter 15 for producing data to be transmitted to the line driver 7 based on the outputs from the address comparator 10, the bit position comparator 14 and the CSMA receiver 13; and a data collector unit 16 for collecting data for the data transmitter 15 based on ON-OFF switching of the key-switch 5a.

FIG. 3 shows the frame structure of the transmission frame used in the system shown in FIG. 1.

In such transmission frame as shown in FIG. 3, a start field 17 is data made up of several bits which indicate the start of the transmission frame and a master field 18 is address data consisting of 13 bits which cover 12 bits of inherent address data of a unit operating as a master and one parity bit. A slave address field 19 is address data consisting of 12 bits of inherent address data of a slave unit, one parity bit and one acknowledge bit. The transmission frame also includes a control code field 20 indicating a data transfer direction between the master and slave units and data field 21 involving a transmission data.

FIG. 4 shows the formation of the address data inherent to each unit used in the system shown in FIG. 1.

As shown in FIG. 4, the inherent address data 22 specific to a given unit comprises 12 bits, of which the high-order 6 bits are common to the group address data 23 and the low-order 6 bits are the unit numbers 24 which are inherent only within the group concerned.

The address allocation or assignment to each unit in this embodiment is as shown in Table 1.

As shown in Table 1, each unit is designated with the inherent address, the group address and the unit number. In the following explanation, "H" shows a hexadecimal notation.

TABLE 1

| Units | Inherent Addresses | Group Addresses | Unit Numbers |
|---|---|---|---|
| Data Processing Unit 2 | 040H | 04H | 00H |
| Output Unit 3 | 080H | 08H | 00H |
| Data Collecting Unit 4a | 0C1H | 0CH | 01H |
| Data Collecting Unit 4b | 0C2H | 0CH | 02H |
| Data Collecting Unit 4c | 0C3H | 0CH | 03H |
| Data Collecting Unit 4d | 0C4H | 0CH | 04H |

In the above Table 1, the upper digit of the group addresses and the unit numbers are respectively of two bits.

The control code field 20 indicates the direction of data transfer in accordance with its contents as shown in the following Table 2.

TABLE 2

| Control Codes | Directions of Data Transfer |
|---|---|
| 1H | From Master unit to Slave unit |
| 3H | From Units having the same group address as Master unit to Slave unit |
| 9H | From Slave unit to Master unit |
| BH | From Slave unit to Units having the same group address as Master unit |

In the allocation of the control codes as in Table 2, the control code "1H" indicates that the master unit sends out a data toward the slave unit and the code "9H" indicates that it receives a data sent from the slave unit. The control code "3H" indicates that not only the master unit but also other units having the same group address as that of the master unit send out a data toward the slave unit, and the code "9H" indicates that not only the master unit but also the other units having the same group address as that of the master unit receive a data sent from the slave unit.

Next, FIG. 5 shows data-bit position data held in the storage 12 of the data collecting units shown in FIG. 1 and FIG. 2.

This data-bit position data 25 includes a data number field 26 and a mask field 27. The data number field 26 consists of four(4) bits and shows an ordinal byte position number in the data field 21 of a plurality of bytes, to which a data is outputted or from which a data is received. That is, the data number fields 26 indicate the byte position to which a data is outputted or from which a data is derived. The mask field 27 consists of eight(8) bits and shows an ordinal bit position within the byte designated by the data number field 26, to which a data is actually outputted or from which a data is actually received. In this embodiment, the data-bit position data 25 stored in the data collecting units 4a-4d are shown in the following Table 3.

TABLE 3

| Units | Data No. Field 26 | Mask Field 27 |
|---|---|---|
| Data Collecting Unit 4a | 2H | 00100000B |
| Data Collecting Unit 4b | 2H | 10000000B |
| Data Collecting Unit 4c | 2H | 01000000B |
| Data Collecting Unit 4d | 2H | 00001000B |

For example, the data collecting unit 4a outputs a data to or receives a data from the third byte in the data field 21 and further at the third bit in the present byte. The data collecting units 4b-4d function as the same as the unit 4a. In the case where there exist a plurality of data to be outputted or to be received, there appears "1" at the corresponding positions in the mask field 27.

Next, the operation where, based on the switched-ON of the key-switch 5a connected to the data collecting unit 4a, the data collecting unit 4a transfers to the data processing unit 2 data as to the state of the key-switch 5a together with the states of the respective key-switches 5b -5d of the other data collecting units 4b-4d will be explained hereunder.

In this case, the data collecting unit 4a serves as a master unit while the data processing unit 2 as a slave unit. The data collecting units 4b-4d have the same group address as that of the data collecting unit 4a. The unit 4a outputs on the bus 1 a start field 17 for indicating the commencement of the data transfer and then outputs its own address as a master address field. In each of the data collecting units 4b-4d, the address field detector 9 detects the master address field 18 and the master address detected therein is supplied to the address comparator 10. As a result, the address comparator 10 informs the data transmitter 15 of the information that the unit serving as a master unit has the same group address as the unit's own group address.

The master unit 4a then outputs an address "040H" as a slave address field 19. As a result, the data processing unit 2 recognizes that this unit itself is designated as a slave unit. The comparator 9 within each of the data collecting units 4b-4d detects the slave address and supplies the result to the comparator 10. The comparator 10 outputs a non-coincident signal.

The master unit 4a then outputs the control data field 20 of "3H". This control code data "3H" is received by the CSMA receivers 13 of the units 4b-4d. As a result, the units 4b-4d recognize the instruction that the data on the states of the key-switches 5b-5d of their own be outputted to a predetermined position of the data field to be transferred next. The data processing unit 2 also receives the control data "3H" and it recognizes that the data on teh states of the corresponding key-switches 5a-5d are being transferred from the units 4a-4d.

Subsequently, the master unit 4a proceeds to transfer the data field 21. As shown in Table 3, the output of the data in the units 4a-4d is executed at the third byte. Thus, the master unit 4a outputs to the bus only the synchronizing clocks at the first and second bytes within the data field 21. These synchronizing clocks are counted at the counters 11 of the units 4a-4d and the bit position in the data field 21 being transmitted is detected.

As shown in FIG. 6, when the data transmission reaches the third data position in the data field 21, the comparator 14 of the unit 4b outputs a coincident signal. As a result, the data transmitter 15 of the unit 4b outputs to the bus 1 through the line driver 7 the data for the state of the key-switch 5b to be indicated as that shown by FIG. 6(d). The unit 4c outputs at the second bit of the same data number the data on the state of the key-switch 5c (FIG. 6(e)). The unit 4a outputs at the third bit the data on the state of the key-switch 5a (FIG. 6(a)). Since the key-switch 5a is in its ON-state, the width of the synchronizing clock "1" is extended. The unit 4d outputs the data on the state of the key-switch 5d at the fifth bit. When all of the key-switches 5b-5d are in their OFF-state, the waveform on the bus 1 is as shown in FIG. 6(c). When all of the key-switches 5b-5d are in their ON-state, the waveform on the bus 1 is as shown in FIG. 6(g).

When the data consisting of 8 bits is thus transferred, the master unit 4a adds one parity bit at the ninth bit and, further, causes the end of data bit to become "1" which indicates the end of the third data transfer.

On the other hand, the data processing unit 2 receives the data on the bus 1 and, when the waveform of the data on the bus 1 is as FIG. 6(h), this unit 2 recognizes "1110100001" and causes the acknowledge bit to become "1" indicating that the data has been received.

Therefore, the data processing unit 2 which has received the transmission frame from the data collecting units analyzes key-switch data and communicates with the output unit 3. Here, the directions are given to the master address 040H, the slave address 080H and the control code "1" and the one-versus-one CSMA type communication as in the conventional communication can be carried out.

Figure 7:
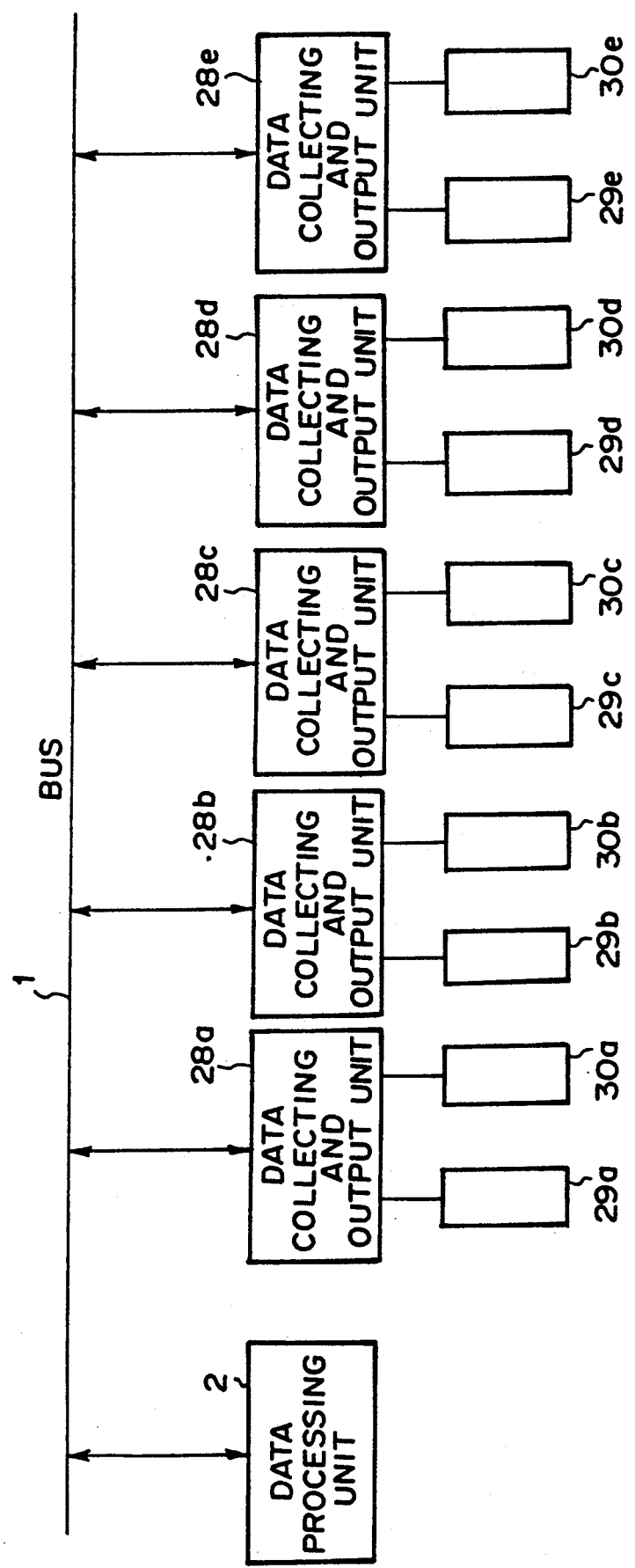
FIG. 7 shows in a block diagram a CSMA type communication system of a second embodiment according to the present invention.

FIG. 7 shows in a block diagram a CSMA type communication system of a second embodiment according to the present invention.

In the communication system shown in FIG. 7, a plurality of data collecting and outputting units 28a-28e belonging to the same group are connected to the data processing unit 2 through the bus 1. A plurality of indicators 29a-29d and sensors 30a-30d are connected respectively to the data collecting and outputting units 28a-28e. The outputs of the sensors 30a-30d are inputted to the respective data collecting and outputting units 28a-28e and received by the data processing unit 2 through the bus 1. The data processed in the data processing unit 2 is sent back to one or all of the data collecting and outputting units 28a-28e and is outputted to corresponding one or all of the indicators 29a-29e.

According to the present embodiment, the transmission frames are transmitted through the bus 1 with the data processing unit 2 always functioning as the master unit. The transmission of the data transmission frame during the data collection is effected by the control code OBH and, in synchronization with the synchronizing signal outputted by the master unit, the data collecting and outputting units 28a-28e output to the bus 1 the output data of the sensors 30a-30e in the data fields. Also, the transmission frame for the indication is effected by the control code and the data fields are outputted by that data processing unit 2 which is the master unit and the data collecting and outputting units 28a-28e receive such data fields.

As explained above, in the system according to this second embodiment, since no transmission frames are generated from the side of data collecting and outputting units 28a-28e irrespective of the direction of the data transmission, it is possible to reduce the occurrence of collision of transmission frames.

As an example, assuming that there are 64 data collecting units each of which is to transfer one bit data to the data processing unit, the conventional CSMA communication system effects 64 times of transmission of the transmission frames each constituted by about 5 bytes but, in the CSMA communication system according to this embodiment, it is sufficient to transmit only one transmission frame constituted by 12 bytes. This means that the system can operate at a speed more than approximately 26 times higher than that in the conventional system.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A CSMA type communication system for transmitting digital data among a data processing unit and a number of groups of data collecting units connected to a bus, said data collecting units each comprising:

a means for storing an own inherent address data, a group address data common to said data collecting units in the same group and a data-bit position data inherently allotted to each of said data collecting units in the same group;

an address comparing means for comparing an address in a transmission frame on said bus with said group address data;

a bit position comparing means for counting a synchronizing signal at a data portion in said transmission frame and comparing said synchronizing signal with said data-bit position data; and a data transmission means for transmitting data synchronously with said synchronizing signal at the own data-bit position in said transmission frame when the address in said transmission frame coincides with the content of the own group address data.

2. A CSMA type communication system for transmitting digital data among a data processing unit and a number of groups of data collecting units connected to a bus, said data collecting units having respective data input devices, said data collecting units each comprising:

a line receiver and a line driver connected to said bus;

an inherent address storage for storing an own inherent address data;

a data-bit position storage for storing a data-bit position data inherently allotted to each of said data collecting units in the same group;

an address field detector for receiving data from said bus through said line receiver and detecting an address field;

an address comparator for comparing outputs from said address field detector and said own inherent address data;

a CSMA receiver and a synchronous signal counter for counting synchronous signals received through said line receiver;

a data-bit position comparator for comparing outputs from said synchronous signal counter and said data-bit position storage;

a data transmitter for transmitting data to the bus through said line driver based on the outputs from said CSMA receiver, said address comparator and said data-bit positon comparator; and a data collector for collecting data from a corresponding data input device and controlling said data transmitter.

3. A CSMA type communication system according to claim 2, wherein said data input devices comprise key switches.

4. A CSMA type communication system according to claim 3, which includes a data processing unit, an output unit and a plurality of said data collecting units all connected to said bus, said data processing unit being for receiving and outputting a transmission frame from and to any of said data collecting units and communicating with said output unit after analyzing key-switch data.

5. A CSMA type communication system according to claim 2, which includes a data processing unit and a plurality of output units combined with said data collecting units thereby forming a plurality of data collecting and outputting units, said data collecting and outputting units belonging to the same group being interconnected through said bus, wherein said data input devices are a sensor and each of said data collecting and outputting units further has an indicator connected thereto, whereby an output of a sensor is forwarded to said data processing unit through said bus after being inputted to the data collecting and outputting unit to which said sensor is connected and a resulting data after being processed at said data processing unit is returned to said data collecting and outputting unit and is outputted to an indicator connected to said data collecting and outputting unit.

6. A CSMA type communication system adapted to transfer data between or among a first unit and a plurality of second units all coupled to a common bus, each of said second units comprising:

a means for storing a group address data allotted to a group;

a means for detecting an address data in a transmission frame on said bus and generating a coincident signal when said address data coincides with said group address data;

a means for storing a bit position data indicating a bit position of the data to be outputted to said bus or of the data to be received from said bus;

a means for counting a synchronizing signal at a data portion in said transmission frame;

a means for generating a detecting signal when the data is to be outputted or is to be received based on a synchronous pulse and said bit position data; and a means for outputting the data to said bus or taking-in the data from said bus based on the generated detection signal during the period in which said coincident signal is being produced.

* * * * *